United States Patent
Morgand et al.

(10) Patent No.: US 7,398,086 B2
(45) Date of Patent: Jul. 8, 2008

(54) SYSTEM AND METHOD TO LOCATE RADIOMOBILES OUTSIDE THE COVERAGE OF A CELLULAR NETWORK

(75) Inventors: Philippe Morgand, Athis-Mons (FR); Jean-Jacques Monot, Courdimanche (FR)

(73) Assignee: Thales, Paris (FR)

( * ) Notice: Subject to any disclaimer, the term of this patent is extended or adjusted under 35 U.S.C. 154(b) by 447 days.

(21) Appl. No.: 10/132,225

(22) Filed: Apr. 26, 2002

(65) Prior Publication Data

US 2002/0183073 A1 Dec. 5, 2002

(30) Foreign Application Priority Data

Apr. 27, 2001 (FR) .................................. 01 05733

(51) Int. Cl.
*H04Q 7/20* (2006.01)
*H04B 7/00* (2006.01)

(52) U.S. Cl. ............... 455/431; 455/456.1; 455/404.1; 455/404.2; 455/521; 455/421; 455/425; 455/423; 455/435.1

(58) Field of Classification Search ............. 455/456, 455/431, 404.2, 521, 456.1, 404.1, 421, 425, 455/423, 435.1
See application file for complete search history.

(56) References Cited

U.S. PATENT DOCUMENTS

| | | | | |
|---|---|---|---|---|
| 3,858,221 A | * | 12/1974 | Harrison et al. ............. 343/815 |
| 5,485,163 A | * | 1/1996 | Singer et al. ................. 342/457 |
| 5,729,826 A | * | 3/1998 | Gavrilovich ................ 455/11.1 |
| 5,752,168 A | | 5/1998 | Monot et al. ............... 455/67.3 |
| 5,929,777 A | * | 7/1999 | Reynolds ............... 340/825.49 |
| 6,134,422 A | * | 10/2000 | Bobadilla et al. ........... 455/561 |
| 6,141,558 A | * | 10/2000 | Chen ...................... 455/456.1 |
| 6,205,341 B1 | | 3/2001 | Monot et al. ................ 455/562 |
| 6,239,746 B1 | | 5/2001 | Pipon et al. ................. 342/440 |
| 6,240,098 B1 | | 5/2001 | Thibault et al. ............. 370/431 |
| 6,253,084 B1 | | 6/2001 | Monot ........................ 455/441 |
| 6,324,398 B1 | * | 11/2001 | Lanzerotti et al. ........... 455/431 |
| 6,347,229 B1 | * | 2/2002 | Zelmanovich et al. ... 455/456.1 |
| 6,349,207 B1 | | 2/2002 | Monot et al. ................ 455/423 |
| 6,430,239 B1 | | 8/2002 | Ferreol ....................... 375/347 |

(Continued)

FOREIGN PATENT DOCUMENTS

EP 1 031 847 A1 8/2000

(Continued)

OTHER PUBLICATIONS

Zachary Lum, "Comint Goes to Cell Hell", JED (Journal of Electronic Defense), Jun. 1998, XP-002189979, (7 pages).

(Continued)

*Primary Examiner*—Vincent P. Harper
*Assistant Examiner*—Marisol Figueroa
(74) *Attorney, Agent, or Firm*—Oblon, Spivak, McClelland, Maier & Neustadt, P.C.

(57) ABSTRACT

A method and system for detecting and locating at least one mobile in a standby mode using a search device located at a certain altitude above the at least one mobile. A simulation of a cellular network activates the at least one mobile within range of the simulated network. At least one parameter representative of at least one signal transmitted by the activated at least one mobile is determined.

17 Claims, 4 Drawing Sheets

U.S. PATENT DOCUMENTS

| | | | |
|---|---|---|---|
| 6,483,461 B1 * | 11/2002 | Matheney et al. | 342/463 |
| 6,490,455 B1 * | 12/2002 | Park et al. | 455/456.4 |
| 6,542,759 B1 * | 4/2003 | Fujiki et al. | 455/575.1 |
| 6,606,309 B1 * | 8/2003 | Wang | 370/322 |
| 6,654,617 B1 * | 11/2003 | Angus et al. | 455/466 |
| 6,714,782 B1 * | 3/2004 | Monot et al. | 455/431 |
| 6,745,037 B1 * | 6/2004 | Neumann et al. | 455/456.1 |
| 6,804,515 B1 * | 10/2004 | McCraw et al. | 455/431 |
| 6,980,815 B1 * | 12/2005 | Enzmann et al. | 455/456.1 |
| 2002/0037721 A1 * | 3/2002 | Tu et al. | 455/434 |

FOREIGN PATENT DOCUMENTS

GB     2 343 088 A     4/2000

OTHER PUBLICATIONS

Kathleen Kocks, "Cellular Intercept: Not Getting Any Easier", JED (Journal of Electronic Defense), Aug. 2000, XP-002189980, (8 pages).

Emmanuel G. Kanterakis, et al., "Soldier's Radio: Innovative Communication and Networking Technologies for the Individual Warrior", IEEE, 1994, vol. 1, pp. 347-354.

* cited by examiner

SYSTEM AND METHOD TO LOCATE RADIOMOBILES OUTSIDE THE COVERAGE OF A CELLULAR NETWORK

BACKGROUND OF THE INVENTION

1) Field of the Invention

The invention concerns a system and a method used to detect and/or locate one or more radiomobiles by using a search device at a certain height above the radiomobile or the radiomobiles to be located.

The invention applies more especially when searching for radiomobiles which are outside the coverage of a cellular network or at the limit of such a network.

It applies for a GSM (Global System for Mobiles) or UMTS (Universal Mobile Telecommunication System) cellular network.

The invention can also be used to obtain the angular location of a radiomobile, such as a mobile telephone, GSM. The location is carried out for example in three dimensions to find the elevation and bearing of the person who has the mobile.

The system is especially designed to enable rescue teams to act as quickly as possible when rescuing people:
- unconscious in mountain region after an air crash or sporting activity in isolated or desert regions,
- under avalanche,
- conscious but blocked due to bad weather conditions in a makeshift or other shelter,
- unconscious in the sea after a yacht has capsized.

The purpose of the invention applies for all national operators and can easily be extended to all European and other countries.

2) Description of the Prior Art

Detection systems operating outside the network coverage are known in the prior art. These systems are portable and employ frequency detection. They are based on a principle of transmitting a broadcast channel of limited range, resulting in proximity detections.

Use of the GSM network for the zones covered by the cellular network is also known. These devices require the presence of three BTSs (Base Transmitter Station).

The system and the method according to the invention are based on a new approach and structure which use a search device comprising a cellular network simulator.

SUMMARY OF THE INVENTION

The invention concerns a method for detection of one or more mobiles using a search device located at a certain altitude above the mobile wherein it comprises at least a cellular communication network simulation step to activate one or more radiomobiles on standby within range of the simulated signals (produced in the simulation step) and wherein it determines at least a parameter representative of one or more signals transmitted by the activated mobile(s).

According to one mode of implementation, the network simulator is used to activate mobiles located outside the network or at the limit of the network.

At the limit of the network it can also use an emergency frequency, defined by an operator.

The method can determine an angular direction of the signals transmitted by the mobile, such as the angle of elevation and/or the azimuth angle. The cellular communication network simulator is for example adapted to a GSM or UMTS type network.

The simulator can modify the parameters of the broadcast channel of the simulated cellular communication network to force the mobile to repeat location updating procedures by simulating a change of cell of the cellular communication network.

The signal detection and the goniometry are carried out for example on $S_{GSM}$ type signals: RACH, SDCCH and FACCH or $S_{UMTS}$ type: PRACH, DPPCH, exchanged between the mobile and the network simulator.

The method may comprise a measurement of the distance between the activated mobile and the network simulator, the distance measurement being associated with the measurement of angular direction to determine the position of the mobile(s) on standby.

The method applies for example to the location in three dimensions of a person in difficulty equipped with a radio mobile in standby mode or a mobile telephone.

The invention also concerns a system for detection and/or location of one or more mobiles at the limit of or outside the coverage of a cellular communication network wherein it comprises at least:
- a device used to simulate a cellular communication network, in order to activate one or more mobiles on standby within range of the simulated signals,
- a device to detect the signals exchanged between a mobile and the network simulator,
- a device to process the signals exchanged.

The system and the method according to the invention offer in particular the following advantages:
- be able to rescue and locate persons located:
  - outside or at the limit of coverage of a cellular network, when they are equipped with a radiomobile in standby mode, and also
  - near a cellular network, provided that a specific frequency is reserved with all BTSs (Base Transmitter Station) in the national or foreign network.
- respect the applicable rules for the protection of the private life of the citizen in terms of identification and location:
  - by allowing a user to switch off his mobile telephone for owners of systems prior to the 3G standard who do not wish to be located,
  - by offering the possibility of using the protection services provided for in the 3G standard and which will soon be implemented in the future equipment,
- the IMSI (International Mobile Subscriber Identifier) number is not extracted and the identify of the mobile owner is known only by the operators.

BRIEF DESCRIPTION OF THE DRAWINGS

Other advantages and features of the invention shall appear more clearly from the following description given by way of an illustration of a system and of a method according to the invention that in no way restricts the scope of the invention and made, with reference to the appended figures of which.

MORE DETAILED DESCRIPTION

To provide a better understanding of the purpose of the invention, the following description given as a non-limiting example concerns the detection of a radiomobile outside or at the limit of the coverage of a GSM cellular network.

Obviously, this description applies to all cellular type networks in which there are at least two signals exchanged between a radiomobile and the network. The method uses access or communication type signals, for example.

For GSM, the method uses the RACH (Random Access Channel), SDCCH (Stand Alone Dedicated Control Channel) and FACCH (Fast Associated Control Channel) type signals which are designated by the reference $S_{GSM}$ in the remainder of the description.

For UMTS, the signals used are PRACH (Packet Random Access Channel) and DPCCH (Dedicated Packet Control Channel) designated with the reference $S_{UMTS}$.

Figure 1:
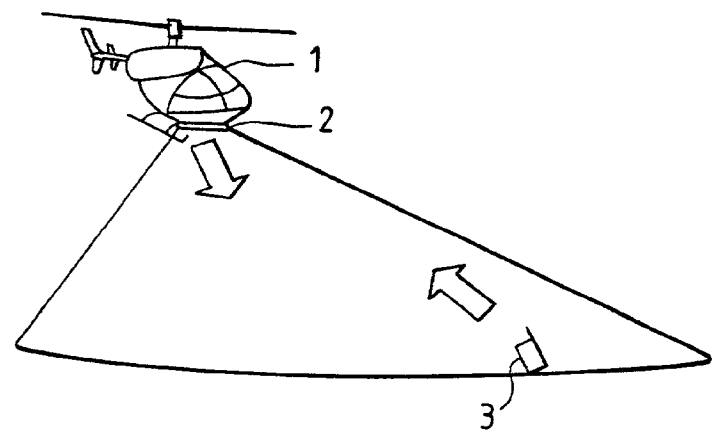
FIG. 1, is a general diagram showing the search device and the mobile to be located.

The principle implemented by the invention is summarized on FIG. 1 which represents a helicopter 1 equipped with a search device 2 according to the invention and a radiomobile 3 to be located.

For the detection and angular location of a radiomobile in elevation and bearing, the following are required:
the radiomobile must be in standby mode,
a search device including, for example:
    a radiomobile activation system, consisting for example of a GSM cellular network simulator, referred to in this document as a base station simulator (BSS),
    a location system comprising a reception antenna and a signal processing device to determine the elevation and bearing arrival angles of a radiomobile.

Figure 2:
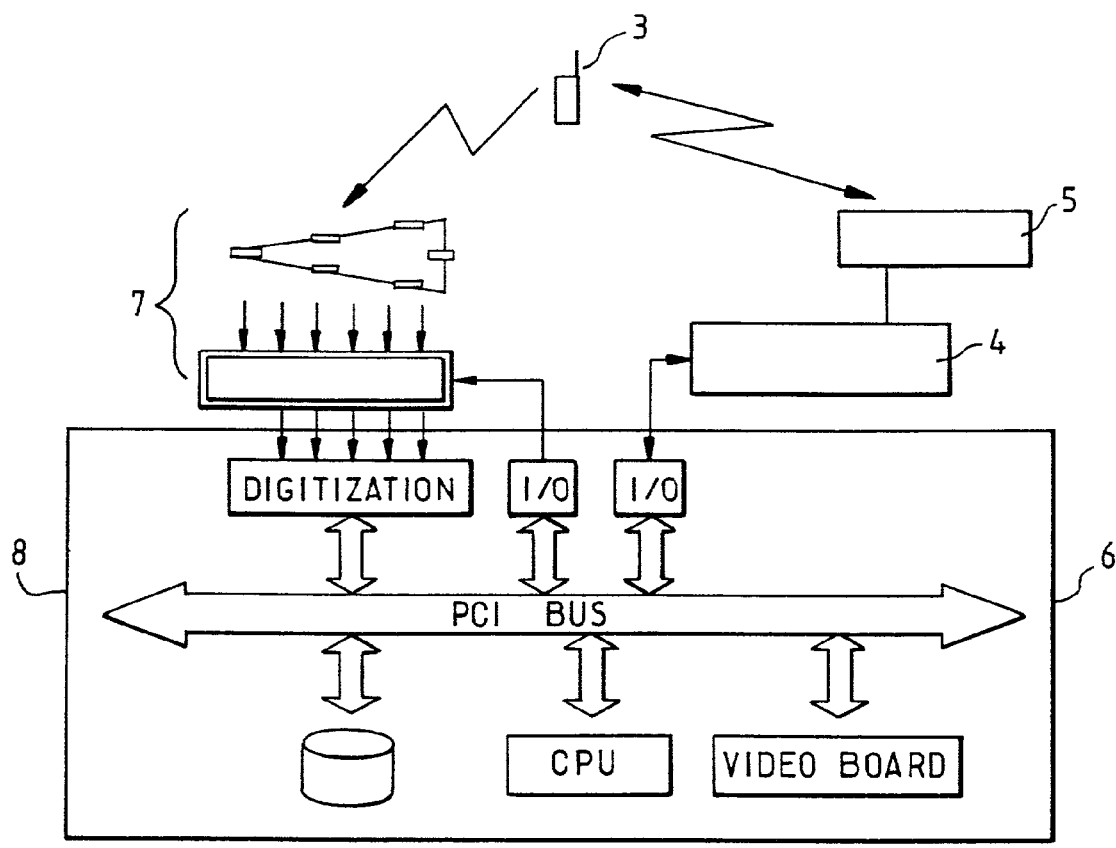
FIG. 2, is an example of the angular location system.

FIG. 2 shows an example of system architecture with a GSM application. The simulator comprises a micro, 4, or BTS (Base Transmitter Station, format A4), an Abis interface not represented, an antenna 5 intended in particular to transmit simulated signals to the mobile on standby that the system is attempting to detect. The simulator must in particular be able to perform some of the functions of a cellular network, i.e. set up a link with one or more mobiles so that the mobiles present in a search area are identified by the simulator.

A PC 6, of industrial type for example, is equipped with data acquisition and processing boards as well as software capable of implementing the steps of the method according to the invention, of executing the signal processing and of managing and controlling the various steps of the method. The PC 6 is connected to the base station simulator 4.

The location device consists for example of a passive antenna 7 and various boards inserted in the PC. An example of implementation of the location algorithms is given in FIGS. 4 and 5.

In GSM or UMTS applications, the frames and slots are formatted by the BTS micro (GSM cellular network) or a B node (UMTS cellular network). The PC controls the procedures and the forcing of the parameters of the transmitted signals.

The PC is for example a Pentium type industrial PC containing signal acquisition and processing boards to execute the measurement algorithms on the $S_{GSM}$ (or $S_{UMTS}$) signals. This computer is equipped with software dedicated to the application and developed in particular to detect/synchronize, count and measure the arrival of wave fronts of the $S_{GSM}$ signals and process the measurements taken.

This software comprises in particular:
An application for detection, sorting and synchronization of the signals received by the search device,
An application for angular location comprising the management of the angular measurements and the local processing of the results so that they can be easily interpreted by the search operator on board,
An application for synchronization with the BS simulator comprising the management of the information (frequency, etc.) supplied and the triggering of reinitialization procedures,
A system application centralizing, if necessary, the data from the various local above-mentioned applications.

The assembly formed by the simulator and the location system is designed for installation for example on a helicopter or on a search vehicle.

Figure 3:
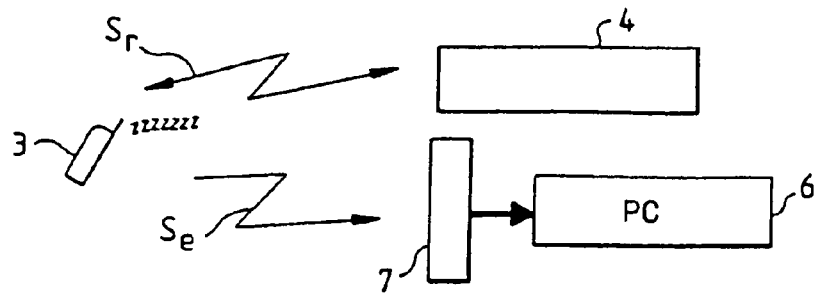
FIG. 3, shows the principle used to activate a radiomobile to be detected.

FIG. 3 represents, for the GSM application, the principle used to activate a radiomobile 3 on standby using the simulator of the base station 4.

The on-board simulator is adapted firstly to activate the mobile. To do this, it transmits a broadcast channel representative of a cellular network. The series of bursts transmitted on a multiframe 51 consists of an FCCH (Frequency Correction Channel), an SCH (Synchronization Channel) and a BCCH (Broadcast Control Channel). On reception of this broadcast channel, the radiomobile sends RACH (Random Access Channel) transmissions.

After activating the radiomobile, the location device 7 and processing device 6 intercept the signals transmitted by the activated mobile.

Figure 4:
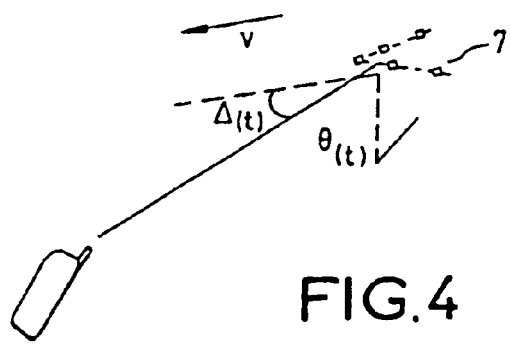
FIG. 4, shows the representation of the angular location principle.

FIG. 4 indicates the parameters required for angular location. In order to locate a mobile telephone from a helicopter, the direction of arrival (DOA) of the wave front must be known in azimuth and elevation. For a helicopter flying with a velocity vector designated by the arrow referenced v, the angles $\Delta(t)$ and $\theta(t)$ represent respectively the elevation and azimuth angles given with respect to the direction of the signals exchanged between the mobile and the simulator. FIG. 4 shows the antenna 7 mounted on the search helicopter. The two angles are estimated by interception using the signals transmitted to the mobile or transmitted by it.

Implementation of the Search Method

One way of implementing the method according to the invention consists for example of carrying out the following steps:
(a) simulate a cellular communication network with a BS simulator by transmitting the parameters usually generated by a cell in a given network, in several directions in order to activate the mobile(s) to be located, The BS simulator supplies various types of information to the PC, mainly: the time information of the start of transmission of the procedures Broadcast Channel, Location updating, transmission of short messages (SMS—Short Message Service), measurement of timing advance (TA). According to an alternative embodiment, the location equipment is set on a frequency serving as broadcast channel if there is no network or possibly on an emergency frequency provided by the operators when there is a network. The frequency generated by the Base Station simulator is transmitted to the location system (PC),
(b) stimulate the mobile(s) on standby, so that the mobiles located in an area accessible by the broadcast channel transmit RACH type signals, on reception of the broadcast channel and/or during the location updating procedure.

The location updating procedures can be initialized periodically. The low recurrence frequencies, for example 1 second, are due to the change of LAI (Location Area Identification) carried out by the BSS simulator.

(c) stimulate the activated mobile(s) after the location updating procedure and forcing by the base station simulator of repeated location updating procedures so that the mobile returns SDCCH type bursts, (d) intercept the RACH transmissions from the radiomobiles on the radio channel with the passive antenna 7, (e) process the RACH signals intercepted in order to access a parameter representative of the mobiles responding. The processing includes, for example, dating and demodulating the parameters of the RACH messages received, sorting the RACH signals according to the dating and the demodulated data, measuring the elevation and bearing angles of arrival by implementing goniometry methods known by those skilled in the art.

For example, the method may use a reference goniometry using the GSM and UMTS synchronization sequences or a direct goniometry based on the natural orthogonality of the CDMA signals sent by the various UMTS mobiles.

The radiomobiles are located from one or more measurements of elevation and bearing angles of arrival (FIG. 4). These angles are estimated for example by the algorithms with the best performance, after detection and synchronization of the signals received by the passive antenna 7.

According to a mode of implementation of the method for a GSM application and in order to improve the location accuracy by a measurement integrated over one or several dozen bursts, during step b), the base station simulator modifying the parameters of the BCCH (broadcast control channel) of the broadcast channel will force the radiomobile to repeat the location updating procedures by simulating a change of cell or by any other method. The objective is in particular to obtain, by intercepting the uplink, the above-mentioned number of bursts. The detection and goniometry of the interception will be carried out on $S_{GSM}$ type bursts.

On connecting to the network via the broadcast channel, the mobile carries out a location updating procedure. This results in transmission of the mobile IMSI so that the network can associate a cell with this new IMSI (initialization of the handover procedure). Secondly, the on-board simulator will carry out the network simulation required for this location procedure and will supply a TMSI (Temporary Mobile Subscriber Identification) according to the procedures defined by the GSM standard applicable to the UMTS, for example.

Lastly, the BSS sends short messages. By setting up communication between the BSS and the mobile, $S_{GSM}$ type uplink bursts are transmitted (link from the radiomobile to the search system).

The short message (SMS) is sent for example from the BSS to the mobile in order to:

reassure the persons to be rescued if they are conscious,
inform the other people on site who have radiomobiles that a rescue operation is taking place.

The uplink bursts generated by transmitting these SMS messages will also be used for goniometry purposes.

Since the activation, location updating and SMS message transmission procedures are similar for GSM and UMTS, the functional aspect of the BSS will be the same. The only difference is in the transmission type, which will be FDD/TDMA for GSM and FDD/CDMA for UMTS.

Figure 5:
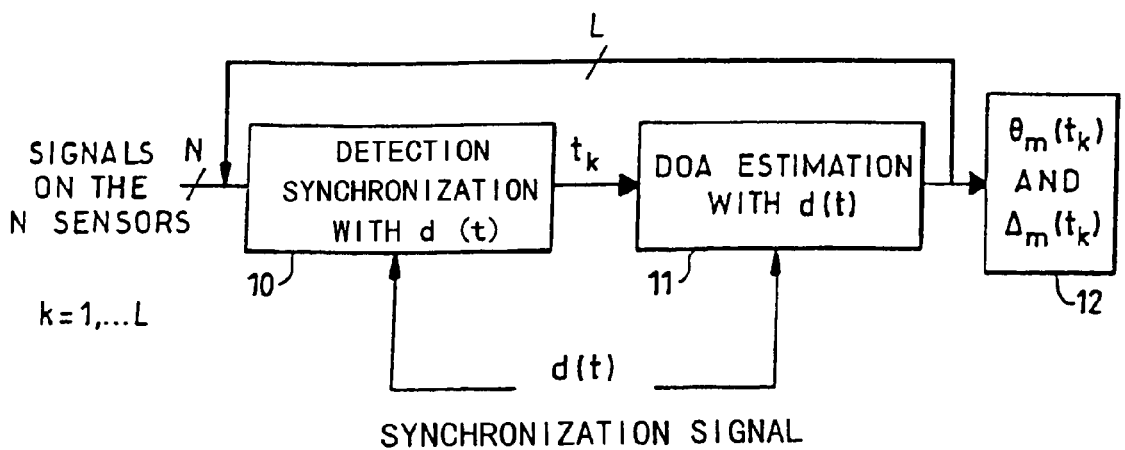
FIG. 5, shows an algorithm to estimate the direction of arrival.

FIG. 5, illustrates an algorithm to determine the angles of arrival.

The N sensors of the antenna receive different bursts or RACH signals from one or more activated mobiles in the cell.

First, the method carries out a sort 10 of the bursts by mobile. This is carried out for example by using the synchronization bits d(t) included in the RACH signals transmitted by a mobile. This sorting step generates burst families corresponding to the number of mobiles present in the cell of the cellular network simulated. To each mobile of index m there corresponds a number L of bursts received at different times, each burst has a delay time tk. For a given mobile m and for each burst transmitted, the PC determines the delay time tk, it also determines, 11, the directions of arrival (DOA) and by implementing reference goniometry software using the synchronization previously carried out, it deduces (12) the elevation and bearing angles, $\Delta m(tk)$, $\theta m(tk)$.

These angle measurements may be associated with distance measurements to obtain the true position of the mobile.

For example, a distance measurement determined from the height measurement obtained using an altimeter fitted in the helicopter and the angles obtained from the goniometry provide accurate information on the distance dm from the helicopter to the mobile.

Another method providing less accurate information is to measure the parameter: radiomobile-BTS propagation time or Timing advance. These measurements supplied via the BSS are known by those skilled in the art and will not be detailed.

Figure 6:
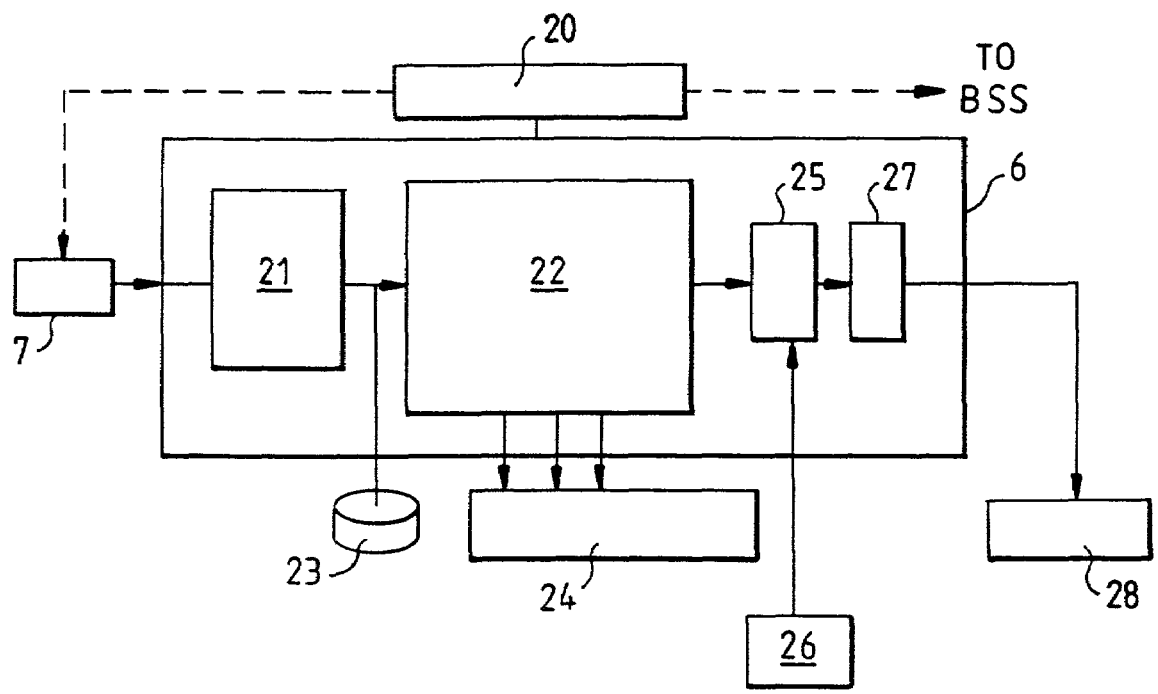
FIG. 6, shows a general software structure.

FIG. 6 is a diagrammatic representation of the general hardware and software structure of the device according to the invention.

The device comprises a user interface 20 connected to the PC, to the BSS and also to the signal reception antenna. By using a PC for control, configuration can be carried in real time out via the man-machine interface.

Figure 7:
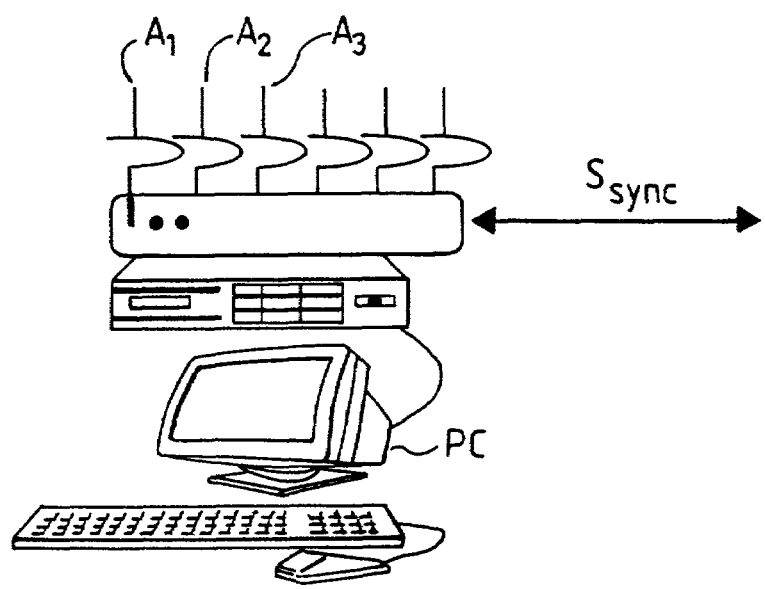
FIG. 7, is an example of a sensor.

The interface can be used to transmit an order to calibrate or tare the antennas to the antenna switch (FIG. 7).

The PC software includes:

A first block 21 for acquisition of data from the N antenna sensors and for baseband transposition, The signals from this first block are sent into a second block 22 detailed on FIG. 5 used to determine the elevation and azimuth angles of arrival, this block may be linked to a mass storage device 23 to store the signals received and also a screen 24 to display the angular results converted into graphical representations, The data supplied to the DOA application, block 22, mainly consists of: the accurate dating of the signals received after sorting (RACH and SDCCH) and the results of the angular location.

A third block 25 is used to determine the distance dm separating the radiomobile replying to the simulator using distance measurements supplied by a block 26 (altimeter, GPS, timing advance, etc.), The angle and distance values are combined in a fourth block 27 to obtain the position(s) of the mobile(s) activated by the BSS, which will then be transmitted to a location display device 28 in order to represent the positions determined on a local map.

Description of the Signal Detection and Interception Sensor

The radioelectric antenna 7 used as signal detector is for example a triangular antenna including N radioelectric sensors, for example six sensors distributed along the three sides. It is fitted underneath the helicopter or at the front of the search vehicle. It can also be trihedral and consist of six sensors distributed on the three edges of the trihedron. In this case, the antenna is positioned according to the helicopter's control bulb.

The radioelectric sensors forming these two antennas are for example semi-omnidirectional in order to limit the disturbance induced by the reflections generated by the on-board mobile. They may be formed from several elementary dual band GSM, DCS (Digital Cellular System) sensors.

FIG. 7 describes an example of the structure of a sensor for detection of signals transmitted in particular by the radiomobile. It consists of a device 7 for reception of the signals exchanged between a mobile and the search device installed on the helicopter (FIG. 1), for example a goniometry antenna network with six antennas Ai, an antenna switch (not represented) used to tare the antennas. One of the six antennas is for example used to synchronize the time when the method will trigger a goniometry measurement. The Ssync signal from the base station simulator (BSS) can also be used as synchronization signal.

The antenna is for example a calibrated network antenna. It may be associated with dual-mode and UMTS broadband receivers equipped with input filters centered on the GSM bands, to reject unwanted transmitters.

The switch is a device known by those skilled in the art, used to tare the reception channels in amplitude and phase. The antenna's reception channels are tared, for example, with a frequency generator positioned as close as possible to the antenna and used for self-calibration of the reception system up to the signal digitization.

The six-channel receiver is for example a 300 kHz (for GSM) instantaneous band receiver (5 MHz for UMTS), equipped with a taring module for the phase and the calibration of the sensor.

Application of the Method According to the Invention to the Search For Persons Outside a GSM Network The search for people who have radiomobiles is carried out for example from a search vehicle such as a helicopter equipped with a location system such as described above, from a point at a certain altitude above and with a direct view over the search area or a vehicle moving towards the search area.

If the exact search location or area is unknown, the search vehicle will carry out a parallel sweep search in order to cover the suspected area.

The system can take and supply elevation and bearing angular measurements for example every two seconds. In order to improve the location, a distance measurement whose accuracy depends on the linearization of the relief can be associated with this angle measurement.

Application to the Search for Persons Inside or at the Limit of Coverage of the GSM Network Similar or identical procedures are implemented in this case, using as working broadcast channel a so-called emergency frequency added by the operator to the list of frequencies used by the cells in the search area.

Consequently, the BSS can force a mobile camped on a cellular network if and only if:
- this so-called emergency frequency (for example the 125$^{th}$ frequency of the GSM and UMTS plan) is declared by the base stations in the network,
- the reception level of this frequency is greater than the reception level of the broadcast channel of the host cell.

Otherwise, it will be impossible to divert the mobile from its local base station. The system is therefore self-protected by the operators and will only be able to operate in authorized cells.

Diagrammatic Description of the DOA Application

Figure 8:
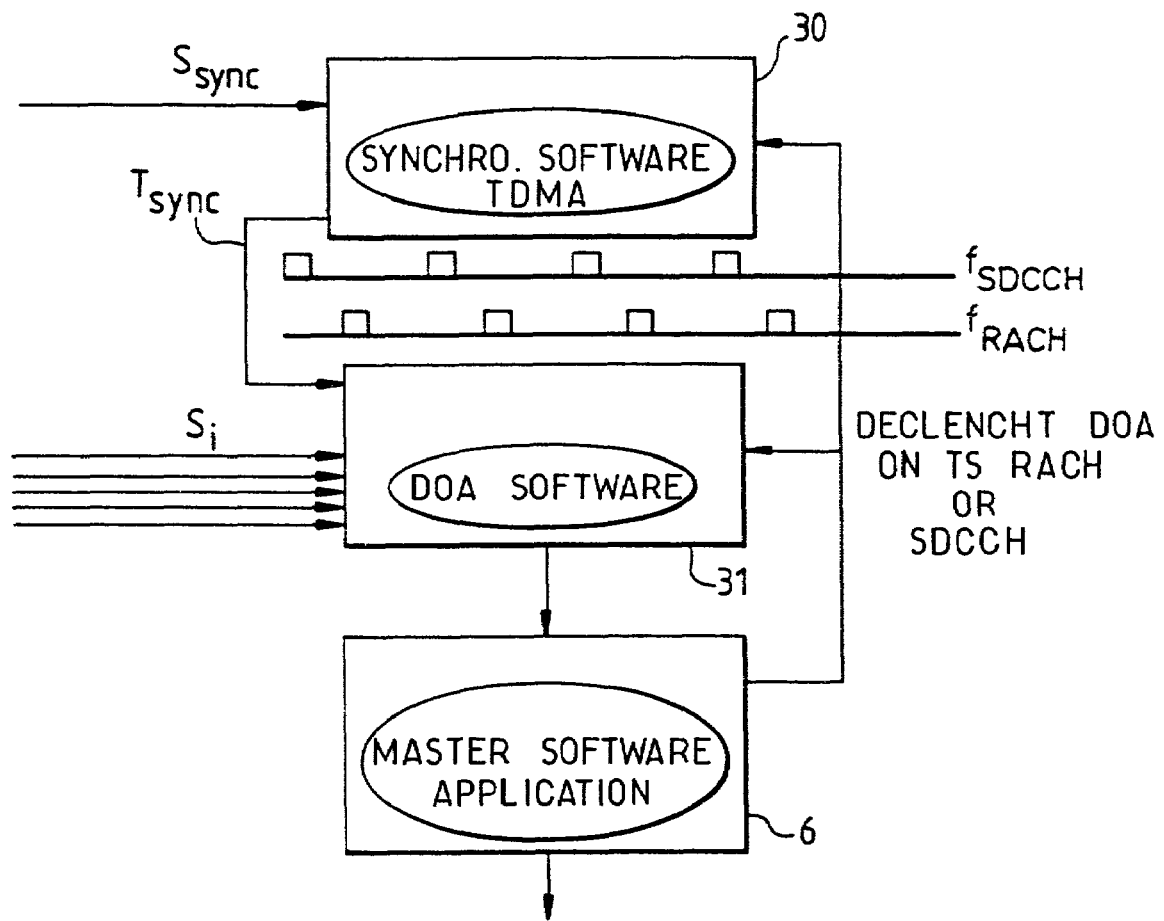
FIG. 8, is an example of structure for the goniometry application.

FIG. 8 represents a possible structure for the goniometry application.

The data supplied by the goniometry application mainly consists of:
1—the accurate dating of the signal and the goniometric sorting tri as defined previously,
2—the angular direction of the source transmitting the signal, and possibly
3—the BCCH frequency, the frame number, the timing advance of the mobile, by demodulation/decoding of the messages broadcast on the BCCH channels and by synchronization measurements between RACH and BCCH,
4—the GSM parameters establishment cause and random access demodulated in the RACH signals used to carry out the sorting.

The structure comprises a first board 30 (daughter board), two-channel fast acquisition type, which receives firstly the Ssync signal used to synchronize the acquisitions of the Si signal exchanged between a mobile and the network, and secondly information from the PC 6 equipped with a master software application. The software is designed to control the acquisition of the signal exchanged on the frequency concerned by the cell where the emergency call is being sought. This first board is used for acquisition of the signals from the sensors and carries out analog/digital conversion. It is connected to a second board used for signal processing.

A second board (mother board) equipped with goniometry software receives the synchronization pulse Tsync from the first board and the signals Si received by the sensor antenna network (FIG. 7) for example six-channel. The DOA software (determination of direction of arrival) can be used to produce files which contain the dates and angular locations of the mobiles and which are transmitted to the PC 6. The synchronization pulse Tsync can be an SDCCH synchro pulse or RACH goniometry type.

For example, two mother boards support the daughter boards and perform the real time burst synchronization software functions. The elevation and bearing location function will either be carried out by the mother boards or by the PC. Since the location must be carried out in real time, a real time processor must be used.

The invention claimed is:

1. A method for detecting at least one mobile in a standby mode, comprising:
   searching with a moving search device located at a varying altitude above said at least one mobile;
   simulating, at said moving search device, a cellular network to activate said at least one mobile, wherein said simulating comprises repeatedly changing the Location Area Identification of a broadcast channel of the simulated network to force said at least one mobile to repeat location updating procedures by simulating a change of cell;
   using a flat plate or trihedral antenna equipped with N radioelectric sensors to detect at least one signal transmitted by said at least one mobile;
   taring a plurality of reception channels of said antenna with a frequency generator, wherein said antenna and said frequency generator are positioned as close as possible to one another, and said frequency generator is used for self-calibration of reception systems up to signal digitization; and
   determining at least one parameter representative of said at least one signal transmitted by said activated at least one mobile.

2. The method of claim 1, wherein the simulating step activates mobiles located at a limit of or outside a network.

3. The method of claim 2, further comprising using an emergency frequency at the limit of the network.

4. The method of claim 1, further comprising determining an angular direction of said at least one signal transmitted by said at least one mobile, including either or both of an angle of elevation and an azimuth angle.

5. The method of claim 1, wherein the simulating step simulates a GSM or a UMTS cellular network.

6. The method of claim 5, wherein detection and goniometry are carried out on $S_{GSM}$ type signals (RACH, SDCCH and FACCH) or $S_{UMTS}$ type (PRACH, DPPCH) exchanged between said at least one mobile and said search device.

7. The method of claim 4, further comprising:
measuring a distance between said activated at least one mobile and said search device; and
associating said distance with said angular direction to determine a position of said at least one mobile in said standby mode.

8. The method of claim 7, wherein said position is a location in three dimensions of a person in difficulty equipped with a radiomobile in standby mode or a mobile telephone.

9. A system for detecting at least one mobile located at a limit of or outside a cellular communication network, comprising:
a simulating device configured to simulate a cellular communication network and activate at least one mobile in a standby mode within a range of the simulating device, the simulating device also being configured to move at a higher altitude relative to said at least one mobile, and to repeatedly change the Location Area Identification of a broadcast channel of the simulated network to force said at least one mobile to repeat location updating procedures by simulating a change of cell;
a flat plate or trihedral antenna equipped with N radioelectric sensors to detect at least one signal transmitted by said at least one mobile;
a frequency generator configured to tare a plurality of reception channels of said antenna, wherein said antenna and said frequency generator are positioned as close as possible to one another, and said frequency generator is configured to perform self-calibration of reception systems up to signal digitization;
a locating device configured to locate at least one mobile located outside said cellular communication network; and
a signal processing device.

10. The system of claim 9, wherein the simulating device is adapted to a GSM network or to a UMTS network.

11. The system of claim 10, wherein the simulating device and the at least one mobile are configured to carry out detection and goniometry of $S_{GSM}$ type signals (RACH, SDCCH and FACCH) or $S_{UMTS}$ type (PRACH, DPPCH).

12. A method for detecting at least one mobile in a standby mode at the limit of or beyond a network of said at least one mobile, comprising:
moving a network simulator arranged in a search vehicle over a search area at a varying altitude;
activating said at least one mobile using said network simulator, wherein said network simulator is configured to repeatedly change the Location Area Identification of a broadcast channel of the simulated network to force said at least one mobile to repeat location updating procedures by simulating a change of cell;
using a flat plate or trihedral antenna equipped with N radioelectric sensors to detect at least one signal transmitted by said at least one mobile;
taring a plurality of reception channels of said antenna with a frequency generator, wherein said antenna and said frequency generator are positioned as close as possible to one another, and said frequency generator is used for self-calibration of reception systems up to signal digitization; and
determining an angular direction of said at least one signal expressed by either or both of an angle of elevation and an azimuth angle.

13. The method of claim 12, further comprising measuring a distance between said at least one mobile and said search vehicle.

14. The method of claim 13, wherein:
said network simulator simulates a GSM or UMTS network; and
said at least one signal has a $S_{GSM}$ type (RACH, SDCCH, and FACCH) or a $S_{UMTS}$ type (PRACH, DPPCH).

15. The method of claim 12, further comprising locating at least one mobile located outside said network.

16. The method of claim 12, wherein said angle of elevation and said azimuth angle are estimated using synchronization bits included in RACH signals transmitted by the activated said at least one mobile.

17. The method of claim 16, wherein said synchronization bits are used to generate burst families corresponding to a number of the at least one mobile located in a range of the simulated network.

* * * * *